United States Patent [19]

Keyson

[11] Patent Number: 5,703,620
[45] Date of Patent: Dec. 30, 1997

[54] CURSOR/POINTER SPEED CONTROL BASED ON DIRECTIONAL RELATION TO TARGET OBJECTS

[75] Inventor: David V. Keyson, Eindhoven, Netherlands

[73] Assignee: U.S. Philips Corporation, New York, N.Y.

[21] Appl. No.: 548,934

[22] Filed: Oct. 26, 1995

[30] Foreign Application Priority Data

Apr. 28, 1995 [EP] European Pat. Off. ............ 95201106

[51] Int. Cl.$^6$ ................................................ G06F 3/033
[52] U.S. Cl. .................................................. 345/145
[58] Field of Search ........................ 345/157, 145, 345/150, 167; 395/358, 326

[56] References Cited

U.S. PATENT DOCUMENTS

| | | | |
|---|---|---|---|
| 5,012,231 | 4/1991 | Felsenstein | 340/709 |
| 5,508,717 | 4/1996 | Miller | 345/157 |
| 5,565,887 | 10/1996 | McCambridge et al. | 345/145 |
| 5,570,111 | 10/1996 | Barrett et al. | 345/145 X |
| 5,598,183 | 1/1997 | Robertson et al. | 345/145 |

FOREIGN PATENT DOCUMENTS

| | | |
|---|---|---|
| 0489469 | 6/1992 | European Pat. Off. . |
| 5249941 | 9/1993 | Japan . |

OTHER PUBLICATIONS

"Is Display/Control Gain a Useful Metric for Optimizing an Interface?", L. Arnaut and J. Greenstein, Human Factors, 32(6), Dec. 1990, pp. 651–663.

*Primary Examiner*—Mark R. Powell

[57] ABSTRACT

The movement of a manual input device in an information processing system determines the movement of a cursor across the system's display. The display visualizes a virtual space, e.g., in a multi-media environment. Certain stationary or moving areas on the display represent target areas serving as possible destinations for the cursor. In order to create a catching effect on the cursor, the system requires more user movement to leave than to enter the target region, thus enhancing target acquisition performance of the user.

8 Claims, 1 Drawing Sheet

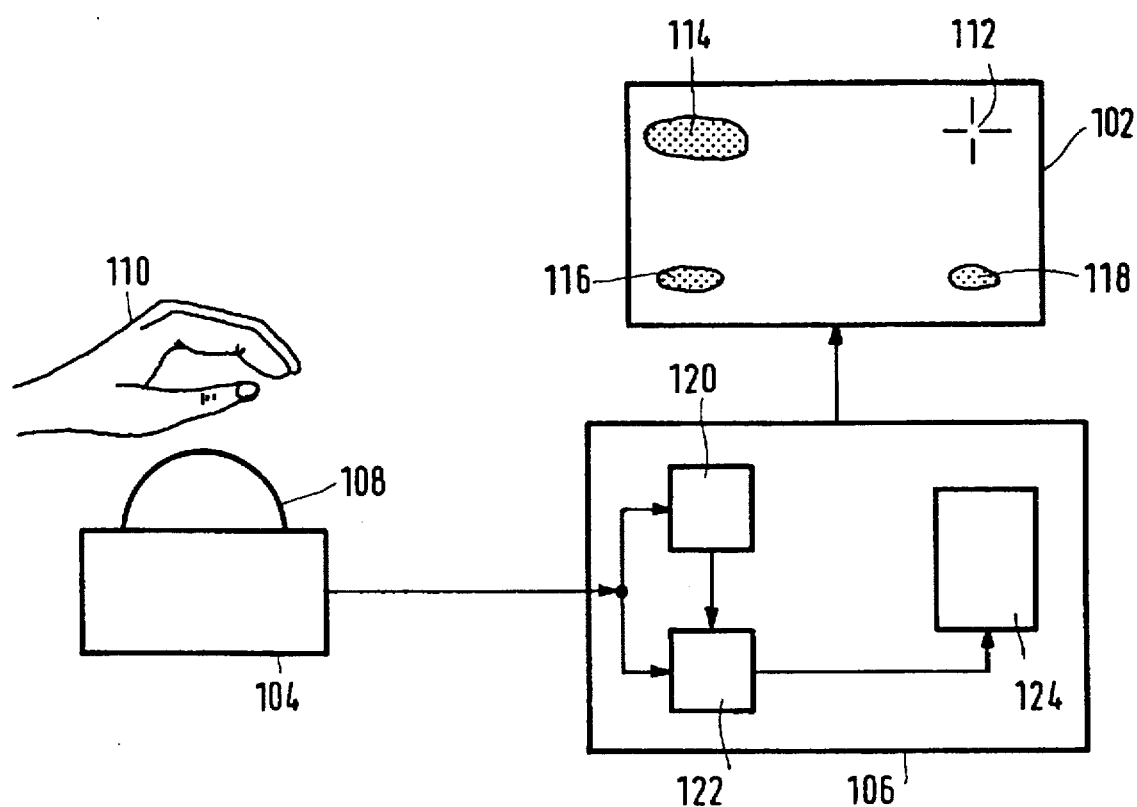

CURSOR/POINTER SPEED CONTROL BASED ON DIRECTIONAL RELATION TO TARGET OBJECTS

BACKGROUND OF THE INVENTION

The invention relates to an information processing system comprising a display for visualizing a virtual space, and comprising a manual input device, coupled to the display and having a moveable part, for enabling a user to guide a cursor through the virtual space in response to the user actuating the moveable part. The invention aim relates to a method of enabling a user to guide the cursor across the virtual space.

A widespread manner of interacting with an information processing system, such as a PC, involves guiding a cursor or another display indicium across a display screen using an appropriate manual input device. Well known examples of manual input devices are mouse, trackball and joystick. Typically, cursor guidance enables selection of a specific item from a menu of items, making drawings, or navigating, all in a virtual space visualized on a display. The user has to position the cursor into a target area or has to guide the cursor through a target area by manipulating the input device, the display then providing visual feedback to the user.

Target acquisition performance in the user interface turns out to depend on feedback of capture progress, i.e., the cursor catching the target area, to the user. Cursor catching is thought of as being represented by the amount of the cursor movement over the displayed target area, referred to as "D", in response to a unit amount of movement on the controlling manual input device, referred to as "C". The ratio is referred to as the D/C gain. In other words, the D/C gain is the ratio of the system's display output and the control input. See for more background information, e.g., "Is Display/Control Gain a Useful Metric for Optimizing an Interface?", L. Arnaut and J. Greenstein, Human Factors, 32(6), December 1990, pp. 651–663.

In considering movement from a given starting point to the centre of a target area, the D/C gain can be characterized by four components: display amplitude, display target width, control amplitude, and control target width. The display amplitude is a quantity that is representative of the overall area of the display that is accessible to the cursor or, alternatively, that is representative of the distance to be moved by the cursor from its starting position. The display target width is representative of the range of cursor positions within the target area. The control amplitude is representative of the range of the movement of the control input or, alternatively, of the distance the control device is to be moved from its starting point to a position that places the display cursor in the target area. The control target width is representative of the range of control input positions corresponding to the cursor locations within the target.

Using above definitions, one can specify two gain levels. A first gain level corresponds to the ratio between the display amplitude and the control amplitude. This ratio is called the "between-target gain level", and quantifies movements between target areas. A second gain level corresponds to the ratio between the display target width and the control target width. This is called the "target gain level", and quantifies movements within the target area.

Arnaut and Greenstein, cited above, discuss a variety of experiments to examine the relationship between target acquisition performance and gain. The results indicate that gain does not sufficiently explain performance. Accordingly, it is questionable if optimizing the control-display relationship should focus solely on gain.

An alternative measure of the difficulty in acquiring a target, as measured by movement time, is given by Fitt's law. According to this law, the movement time is decreased as the control target width is increased, assuming that the target distance is a constant. In a formula, Fitt's law is:

$$\text{Movement time} = a + b \log(2c/t),$$

wherein a and b are empirically determined parameters, "c" is the control amplitude, and "t" is the control target width. The expression $\log(2c/t)$ is usually referred to as the index of difficulty of the movement.

However, Fitt's law predicts total movement time for a movement task wherein the control and display are fully integrated rather than separate as in a mouse- or trackball-controlled system. More specifically, Fitt's law applies to procedures wherein control amplitude and display amplitude are identical, i.e., wherein the between-target gain equals unity, such as in grasping an object with one's hand. Under conditions where control target width and display target width are physically separate features, one could imagine that a larger control target width, in relation to the display target width, would lead to longer movement times, simply because of the increase in time required to enter and leave the target area.

The conventional approach discussed above does neither explain adequately target acquisition performance nor does it provide a basis for optimizing the performance in terms of movement times for manual input devices. It is, inter alia, an object of the invention to decrease these movement times and to provide a system that is more user-friendly than conventional cursor-operating systems.

SUMMARY OF THE INVENTION

To this end, the invention provides a system as specified in the preamble, characterized in that the system is operative to decrease an amount of movement of the moveable part, required to move the cursor a unit distance, below a pre-specified level when the cursor is entering a pre-specified area in the virtual space and to increase the amount above the level when the cursor is leaving the area.

The inventor has realized that dynamically varying the movement effort in this manner has a catching effect on the cursor, such that more user movement is required to leave than to enter the target region. In other words, shorter control movements are required to approach than to leave the centre of the target. This type of target gain is herein referred to as the "dynamic target gain". Note that in the reference cited above, in contrast the gain is a fixed quantity in each individual test run.

Preferably, the system is operative to render a total mount of movement of the moveable part, in order to have the cursor travel a particular distance for entering and thereupon leaving the area, substantially equal to a total amount of movement of the moveable part for having the cursor travelling the particular distance at a between-target gain level. As a consequence, the dynamic target gain thus catches user's movements without requiring additional movement effort. For example, the gain for movements towards the centre of a target is substantially twice the between-target gain level, and the gain for movements away from the centre is substantially half the between-target gain.

Preferably, the decrease and increase of the amount of movement of the moveable part are gradual and depend on a distance from a particular location in the target area, e.g., the centre of the target area, so as to avoid any abrupt cursor movement.

The features controlling the variable movement effort preferably are implemented in the software (application software) and can simply be embedded in, e.g., the software portion that controls the system's display. For example, assume that the software specifies a transfer function that functionally relates the movement of the moveable part of the manual input device to the movement of the cursor across the display. When the cursor is made to enter or to leave the target area in the virtual space under control of the user movement, an indication is created that effects a modification of the transfer function. The modification is brought about by, e.g., an appropriate scaling factor of the transfer function.

The invention is particularly, but not exclusively, suitable for multimedia applications to optimize user-interactivity.

Since the invention can be implemented fairly simply in existing information processing systems, the invention also relates to a method of enabling a user to catch a target area with a cursor in a virtual space visualized on a display under control of a moveable part of a manual input device coupled to the display. According to the invention, the method is characterized by decreasing an amount of movement of the moveable part, required to move the cursor a unit distance, below a pre-specified level when the cursor is entering a target area in the virtual space; and increasing the amount above the level when the cursor is leaving the area. Preferably, the increasing and decreasing is done gradually to avoid abrupt cursor movements.

DESCRIPTION OF THE DRAWING

The invention is explained below in further detail and by way of example with reference to the accompanying drawing, wherein:

FIG. 1 is a functional diagram of a system according to the invention.

DETAILED DESCRIPTION OF THE PREFERRED EMBODIMENT

FIG. 1 is a functional diagram of an information processing system 100 in the invention. System 100 comprises a display 102 for visualizing a virtual space, and a manual input device 104. Device 104 is functionally coupled to display 102 via application software 106 and has a moveable part 108 for enabling a user 110 to guide a cursor 112 through the virtual space in response to the user 110 actuating moveable part 108. In the example shown, manual input device 104 includes a trackball device whose rotatable ball plays the role of moveable part 108. According to the invention, system 100 is operative to decrease an amount of movement of moveable part 108, required to move cursor 112 a unit distance over display 102, below a pre-specified level when cursor 112 is entering any one of target areas 114, 116 or 118, in the virtual space, and to increase the amount above the level when cursor 112 is leaving the relevant one of target areas 114-118.

The dynamic target gain is created, for example, as follows. Application software 106 functionally comprises a position comparator 120 to continually determine if the position of cursor 112 lies within or outside any of target areas 114-118. Software 106 further functionally comprises a motion comparator 122 to determine whether or not the movement of cursor 112 is towards or away from a centre of any of target areas 114-118 in case cursor 112 is within the relevant one of target arms 114-118. Software 106 also includes a transfer function 124 operative to convert a movement of moveable part 108 into a corresponding movement of cursor 112 across display 102. It is assumed that transfer function 124 provides an increased output when its input increases. If a position of cursor 112 comes within the range of any of target areas 114-118 then transfer function 124 is modified via comparators 120 and 122 to decrease an amount of movement of moveable part 108, required to move cursor 112 a unit distance over display 102. This could be done by scaling up the input or the output of transfer function 124 so that less user movement results in larger cursor movement. If a position of cursor 112 lies within any of target areas 114-118 and is made to move away from the area's centre, then comparators 120 and 122 modify transfer function 124 to increase the amount of movement of moveable part 108, required to move cursor 112 a unit distance over display 102. This could be achieved by scaling down the input or the output of transfer function 124 so that the user movement results in smaller cursor movement.

The increase or decrease of the amount of user movement required to move cursor a unit distance preferably is gradual so as to avoid abrupt cursor movements. This could be achieved by varying the scaling up or down of the transfer function in dependence of a distance of cursor 112 from a centre of any of target areas 114-118 when cursor 112 is within range of target areas 114-118. The term "gradual" is to be understood as applying to the movement of cursor 112 as perceived by user 110. The variation could still be stepwise using two or more different scaling factors so as to save processing power of the system's CPU (not shown) or memory capacity when transfer function 124 and its scaled-up and sealed-down versions are stored as look-up tables in the system's memory (not shown).

Target areas 114-118 need not be stationary. In, e.g., a computer game calling on the user's adroitness, areas 114-118 may represent moving targets to be caught by positioning cursor 112 over the targets. Further, in the example shown, manual input device 104 includes a trackball device whose rotatable ball plays the role of moveable part 108. It is clear that other types of input devices, such as mice or joysticks, could be used as well in the invention, as the cursor catching assistance implemented by the invention is largely modality independent. The cursor catching according to the invention may be combined with tactile feedback to the user via a special manual input device, e.g., such as the one disclosed in European Patent Application 0 489 469.

System 100 in FIG. 1 may be a part of a larger, multi-user system with geographically distributed stations, each including a respective manual input device 104 and a display 102. Software 106 then may be run partly or entirely on a central server (not shown). A communication network such as the telephone network couples the various manual input devices and the displays to the server. Some users then may guide the target areas 114-118, whereas other users may be controlling one or more cursors, each respective one of the users having visual access to the virtual space or a respective customized portion thereof.

What is claimed is:

1. An information processing system comprising:

a display for visualizing a virtual space;

a manual input device coupled to the display and having a moveable part for enabling a user to guide a cursor through the virtual space in response to the user actuating the moveable part; wherein the system is operative to decrease an amount of movement of the moveable part, required to move the cursor a unit distance, below a pre-specified level when the cursor is within a target area in the virtual space and is moving towards a centre of the target area and to increase the amount above the level when the cursor is within the target area and is moving away from the centre.

2. The system of claim 1, operative to render a total amount of movement of the moveable part, in order to have the cursor travel a particular distance for entering and thereupon leaving the area, substantially equal to a total amount of movement of the moveable part for having the cursor travelling the particular distance at a between-target gain level.

3. The system of claim 1, operative to effect at least the decrease or the increase gradually in dependence on a position of the cursor relative to a particular location in the area so as to avoid noticeably abrupt cursor movement.

4. The system of claim 1, operative to run a software application that comprises a transfer function to convert a movement of the moveable part into a movement of the cursor, and operative to modify the transfer function in dependence on a position of the cursor and a direction of movement of the cursor.

5. A method of enabling a user to catch a target area with a cursor in a virtual space, visualized on a display, under control of a moveable part of a manual input device coupled to the display, the method comprising decreasing an amount of movement of the moveable part, required to move the cursor a unit distance, below a pre-specified level when the cursor is within a target area in the virtual space and is moving towards a centre of the target area; and increasing the amount above the level when the cursor is within the target area and is moving away from the centre.

6. The method of claim 5, wherein a total amount of movement of the moveable part, in order to have the cursor travel a particular distance for entering and thereupon leaving the area, is rendered substantially equal to a total amount of movement of the moveable part for having the cursor travelling the particular distance at a between-target gain level.

7. The method of claim 5, wherein at least the decreasing or the increasing is made gradual so as to avoid noticeably abrupt cursor movement.

8. The system of claim 2, operative to effect at least the decrease or the increase gradually in dependence on a position of the cursor relative to a particular location in the area so as to avoid noticeably abrupt cursor movement.

\* \* \* \* \*